United States Patent
Chen et al.

(10) Patent No.: US 11,337,213 B2
(45) Date of Patent: May 17, 2022

(54) SIGNAL RECEIVING METHOD, APPARATUS, AND DEVICE

(71) Applicant: HUAWEI TECHNOLOGIES CO., LTD., Guangdong (CN)

(72) Inventors: Xi Chen, Shenzhen (CN); Zhiqiang Zou, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 120 days.

(21) Appl. No.: 16/991,602

(22) Filed: Aug. 12, 2020

(65) Prior Publication Data

US 2020/0374876 A1    Nov. 26, 2020

Related U.S. Application Data

(63) Continuation of application No. PCT/CN2019/071194, filed on Jan. 10, 2019.

(30) Foreign Application Priority Data

Feb. 13, 2018    (CN) .......................... 201810149641.1

(51) Int. Cl.
*H04W 72/04* (2009.01)
*H04W 16/14* (2009.01)
(Continued)

(52) U.S. Cl.
CPC ....... *H04W 72/0446* (2013.01); *H04W 16/14* (2013.01); *H04W 72/082* (2013.01)

(58) Field of Classification Search
None
See application file for complete search history.

(56) References Cited

U.S. PATENT DOCUMENTS

| 8,009,750 B2 | 8/2011 | Chrabieh et al. |
| 9,742,610 B2 | 8/2017 | Arambepola et al. |

(Continued)

FOREIGN PATENT DOCUMENTS

| CN | 101136654 A | 3/2008 |
| CN | 102291363 A | 12/2011 |

(Continued)

OTHER PUBLICATIONS

M. Renfors et al., "Efficient fast-convolution implementation of filtered CP-OFDM waveform processing for 5G", IEEE Journal on Selected Areas in Communications (Special Issue on Deployment Issues and Performance Challenges for 5G), vol. 35, No. 6, pp. 1309-1326, 2017. (Year: 2017).*

(Continued)

*Primary Examiner* — Faruk Hamza
*Assistant Examiner* — Cassandra L Decker
(74) *Attorney, Agent, or Firm* — Fish & Richardson P.C.

(57) ABSTRACT

Example signal receiving methods and apparatus are described. One example method includes receiving a time-domain signal sent by a sending device. The time-domain signal is replicated to obtain N time-domain signals. N window functions are configured, where the N window functions are in a one-to-one correspondence with the N time-domain signals. An operation is performed on each of the N time-domain signals based on a corresponding window function to obtain N windowed time-domain signals. The N windowed time-domain signals are separately converted to obtain N frequency-domain signals. An RB corresponding to an interference frequency is determined. One or more RBs are selected from each of the N frequency-domain signals and are arranged in sequence based on indexes to obtain a target frequency-domain signal.

18 Claims, 4 Drawing Sheets

(51) Int. Cl.
*H04W 72/08* (2009.01)
*H04L 5/00* (2006.01)
*H04L 27/26* (2006.01)

(56) References Cited

U.S. PATENT DOCUMENTS

| | | | |
|---|---|---|---|
| 2006/0008017 A1* | 1/2006 | Balakrishnan | H04L 27/2626 375/260 |
| 2007/0177685 A1* | 8/2007 | Kawauchi | H04L 25/0216 375/260 |
| 2009/0161804 A1 | 6/2009 | Chrabieh et al. | |
| 2011/0045776 A1 | 2/2011 | Laroia et al. | |
| 2011/0058626 A1* | 3/2011 | Balakrishnan | H04L 27/2613 375/296 |
| 2014/0079248 A1* | 3/2014 | Short | G16B 50/30 381/119 |
| 2019/0029026 A1 | 1/2019 | Yun et al. | |

FOREIGN PATENT DOCUMENTS

| | | |
|---|---|---|
| CN | 104854806 A | 8/2015 |
| CN | 105450561 A | 3/2016 |
| CN | 105516032 A | 4/2016 |
| CN | 105827560 A | 8/2016 |
| CN | 105847209 A | 8/2016 |
| CN | 107306238 A | 10/2017 |
| EP | 2068474 A1 | 6/2009 |
| EP | 2101462 A2 | 9/2009 |
| EP | 2427974 A2 | 3/2012 |
| EP | 3104570 A1 | 12/2016 |
| WO | 2013009522 A1 | 1/2013 |
| WO | 2016155503 A1 | 10/2016 |
| WO | 2017119637 A1 | 7/2017 |

OTHER PUBLICATIONS

PCT International Search Report and Written Opinion issued in International Application No. PCT/CN2019/071194 dated Apr. 9, 2019, 15 pages (with English translation).

Extended European Search Report issued in European Application No. 19754683.1 dated Feb. 18, 2021, 6 pages.

Office Action issued in Chinese Application No. 201810149641.1 dated May 27, 2021, 8 pages (with English translation).

Peng Wei, "Researches on Sidelobe Suppression Based on Novel Multicarrier Transmission," Doctoral Dissertation, University of Electronic Science and Technology of China, Jun. 2017, 142 pages (with English abstract).

Qualcomm Incorporated et al., "EVM for Intra-band contiguous UL CA for non-equal Channel BWs," 3GPP TSG-RAN WG4 Meeting #75, R4-153777, Fukuoka, Japan, May 25-29, 2015, 9 pages.

Rhode & Schwarz, "Annex E: Updates for NB-IoT," 3GPP TSG-RAN WG5 Meeting #74, R5-170895, Athens, Greece, Feb. 13-17, 2017, 19 pages.

Rhode & Schwarz, "Typos in 36.521-1, Annex E," 3GPP TSG-RAN WG5 Meeting #46, R5-100569, San Francisco, USA, Feb. 22-26, 2010, 18 pages.

Office Action issued in Indian Application No. 202047035577 dated Sep. 6, 2021, 5 pages.

* cited by examiner

SIGNAL RECEIVING METHOD, APPARATUS, AND DEVICE

CROSS-REFERENCE TO RELATED APPLICATIONS

This application is a continuation of International Application No. PCT/CN2019/071194, filed on Jan. 10, 2019, which claims priority to Chinese Patent Application No. 201810149641.1, filed on Feb. 13, 2018. The disclosures of the aforementioned applications are hereby incorporated by reference in their entireties.

TECHNICAL FIELD

Embodiments of this application relate to the field of communications technologies, and in particular, to a signal receiving method, apparatus, and device.

BACKGROUND

As an electromagnetic wave that carries and transmits a signal, a spectrum resource is a nonrenewable resource. Based on this, to facilitate management of the spectrum resource, a configuration policy of the spectrum resource is to allocate a specific quantity of spectrums of proper frequency bands to different communication services. For example, a spectrum that occupies A MHz in a 900 MHz frequency band is allocated to a signal communication service whose network standard is a global system for mobile communications (GSM), a spectrum that occupies B MHz in a 1800 MHz frequency band is allocated to a signal communication service whose network standard is long term evolution (LTE), and A and B are positive integers.

However, with development of technologies, people's daily communications traffic increases greatly, resulting in a shortage of fixedly allocated spectrum resources. Therefore, to improve utilization of the spectrum resources, a manner of multi-standard spectrum sharing is currently used to transmit a signal. The multi-standard spectrum sharing means that signals of a plurality of network standards share one spectrum range for transmission. For example, an LTE signal and a GSM signal share one spectrum for transmission.

It needs to be noted that, usually, the LTE signal is transmitted based on an orthogonal frequency division multiplexing (OFDM) technology. A transmission mechanism of the OFDM technology is that a sending device sends a time-domain signal, and after receiving the time-domain signal, a receiving device performs a fast Fourier transformation (FFT) operation on the time-domain signal to convert the time-domain signal into a frequency-domain signal, and then performs an operation such as demodulation on the obtained frequency-domain signal. In the mechanism for converting the time-domain signal into the frequency-domain signal based on the OFDM technology, the received time-domain signal needs to be first truncated by using a rectangular window, and then the FFT operation is performed on the truncated time-domain signal.

Based on this, subcarriers of an OFDM signal such as the LTE signal are orthogonal to each other. Therefore, after signals are transformed through FFT, no interference exists between the signals, and an obtained frequency-domain signal is shown in FIG. 1. However, for another non-OFDM signal (referred to as an inter-RAT signal in the embodiments of this application) such as the GSM signal, after the non-OFDM signal is truncated by using the rectangular window and is transformed through the FFT, the signal that is truncated and that is transformed through the FFT is spread out of a spectrum that needs to be occupied and rolls off relatively slowly, as shown in FIG. 2. This phenomenon is called spectrum leakage.

It can be learned that when the OFDM signal and the inter-RAT signal share a spectrum, severe spectrum leakage exists for the frequency-domain signal obtained by performing the FFT operation. Consequently, the inter-RAT signal occupies another spectrum, thereby causing interference to the signal in the occupied spectrum to some extent, and further reducing receiving performance of the OFDM signal.

SUMMARY

Embodiments of this application provide a signal receiving method, apparatus, and device, to resolve a problem that severe spectrum leakage is caused by using multi-standard spectrum sharing when a signal is transmitted by using an OFDM technology.

According to a first aspect, an embodiment of this application provides a signal receiving method. The method includes: receiving a time-domain signal sent by a sending device; replicating the time-domain signal to obtain N time-domain signals, where N is greater than or equal to 2 and is less than or equal to a total quantity of resource blocks (RB) in a resource block group (RBG) corresponding to the time-domain signal; configuring N window functions, where the N window functions are in a one-to-one correspondence with the N time-domain signals, window lengths corresponding to the N window functions are all greater than or equal to 0 and are less than or equal to a length of a preset cyclic prefix (CP) the time-domain signal, and the window lengths corresponding to the N window functions are different; performing an operation on each of the N time-domain signals based on a corresponding window function to obtain N windowed time-domain signals; separately converting the N windowed time-domain signals to obtain N frequency-domain signals, where the RBs in the RBG all meet the following condition in the N frequency-domain signals: being arranged in sequence based on indexes, where the indexes refer to identifier indexes, of the RBs, in the RBG; determining an RB corresponding to an interference frequency, where the interference frequency refers to a frequency on which interference is generated; selecting several RBs from each of the N frequency-domain signals, where the RBs selected from each of the N frequency-domain signals are different from those selected from another frequency-domain signal, and a distance between RBs selected from a frequency-domain signal with a relatively long window length and the RB corresponding to the interference frequency is less than that between RBs selected from a frequency-domain signal with a relatively short window length and the RB corresponding to the interference frequency; and arranging the selected RBs in sequence based on indexes to obtain a target frequency-domain signal.

That is, in this embodiment of this application, after receiving the time-domain signal, the receiving device, by replicating the time-domain signal into the N time-domain signal, configures one window function for each of the N time-domain signals and shapes each time-domain signal with one window. After the time-domain signal is converted into the N frequency-domain signals, because the window lengths corresponding to the N window functions are different from each other, and a longer window length brings a better interference suppression effect on spectrum leakage, RBs with optimal performance may be selected from frequency-domain signals corresponding to different window lengths. Finally, the selected RBs are arranged in sequence based on the indexes, to obtain a final frequency-domain signal.

It can be learned that in this implementation, one time-domain signal is shaped with a plurality of windows. This not only breaks a limitation that shaping with one window imposes on signal performance improvement, but also can more accurately balance performance of each RB. In addition, RBs with best performance are selected based on different window lengths, and the selected RBs with best performance are combined to obtain the target frequency-domain signal, so that signal performance can be improved as a whole.

With reference to the first aspect, in a first possible implementation of the first aspect, the determining an RB corresponding to an interference frequency includes: identifying the indexes of the RBs in the RBG; determining, based on the indexes, RBs not configured in the RBG, where the RBs not configured in the RBG include an RB corresponding to a missing index between a minimum index and a maximum index in the indexes, an RB corresponding to an index being a minimum index minus 1, and an RB corresponding to an index being a maximum index plus 1; and determining the RBs not configured in the RBG, as RBs corresponding to the interference frequency.

With reference to the first aspect, in a second possible implementation of the first aspect, the determining an RB corresponding to an interference frequency includes: determining a frequency number of the interference frequency, determining an index of a corresponding RB based on the frequency number; and determining the RB corresponding to the index as the RB corresponding to the interference frequency.

Because performance of RBs in the frequency-domain signal is different when the RBs correspond to different window lengths, in this embodiment of this application, an RB with optimal performance may be selected from the N frequency-domain signals based on a correspondence between an interference value and a window length. Based on this, the RB corresponding to the interference frequency may be first determined.

Specifically, before the sending device sends the time-domain signal, a base station usually needs to schedule a spectrum resource carrying corresponding information and a transmitted signal. According to a function and a scheduling rule of the base station, the RB corresponding to the interference frequency may be determined in two implementations. In this implementation, an RB with a maximum interference strength in the frequency-domain signal can be determined, thereby laying an implementation basis for selecting the RB with optimal performance.

With reference to the first aspect, in a third possible implementation of the first aspect, the arranging the selected RBs in sequence based on indexes to obtain a target frequency-domain signal specifically includes: arranging RBs other than the RB corresponding to the interference frequency in sequence based on indexes to obtain the target frequency-domain signal.

With reference to the first aspect, in a fourth possible implementation of the first aspect, the arranging the selected RBs in sequence based on indexes specifically includes: when an interference strength corresponding to the interference frequency is greater than a preset threshold, arranging, in sequence based on indexes, the RB corresponding to the interference frequency and an RB other than an RB adjacent to the RB corresponding to the interference frequency to obtain the target frequency-domain signal.

Specifically, to set a guard interval and reduce interference caused by interference to useful information, during RB configuration, the RB corresponding to the interference frequency is usually configured not to carry any information. Based on this, when combining the selected RBs, the receiving device may directly delete the RB corresponding to the interference frequency, and arrange only the RBs other than the RB corresponding to the interference frequency in sequence based on the indexes. If the interference is relatively strong, the RB corresponding to the interference frequency and the RB other than the RB adjacent to the RB corresponding to the interference frequency may even be arranged in sequence based on the indexes, to obtain the target frequency-domain signal.

It can be learned that in this implementation, a quantity of RBs in the target frequency-domain signal can be reduced, so that overheads occupied for parsing the target frequency-domain signal can be reduced.

With reference to the first aspect, in a fifth possible implementation of the first aspect, after the receiving a time-domain signal sent by a sending device and before the replicating the time-domain signal to obtain N time-domain signals, the method further includes: determining a total bandwidth of the time-domain signal; and calculating the total quantity of the RBs in the RBG based on the total bandwidth of the time-domain signal.

Specifically, the time-domain signal and the frequency-domain signal are expressions of two dimensions of a same signal. In time domain, one RB is one slot, and in frequency domain, one RB is 12 subcarriers. Based on this, after receiving the time-domain signal, the receiving device may determine, based on the total bandwidth of the time-domain signal, the total quantity of RBs in the RBG corresponding to the time-domain signal.

In the art, an RB is usually used as a composition unit of a frequency-domain signal. Therefore, when interference to a signal is determined, interference to an RB may be specifically determined. Based on this, N may be a maximum quantity of RBs. In addition, in this implementation, when the interference to the signal is determined, the interference to an RB may be specifically determined, so that signal performance can be optimized as a whole.

According to a second aspect, an embodiment of this application provides a signal receiving apparatus. The apparatus includes modules configured to perform the method steps according to the first aspect and the implementations of the first aspect.

According to a third aspect, an embodiment of this application further provides a signal receiving device. The device includes a transceiver, a processor, and a memory. The transceiver, the processor, and the memory may be connected by using a bus system. The memory is configured to store a program, an instruction, or code, and the processor is configured to execute the program, the instruction, or the code in the memory to complete the method according to any one of the first aspect or the possible designs of the first aspect.

According to a fourth aspect, an embodiment of this application provides a computer-readable storage medium. The computer-readable storage medium stores an instruction, and when the instruction is run on a computer, the computer is enabled to perform the method according to any one of the first aspect or the possible designs of the first aspect.

To resolve a problem in the prior art, in the embodiments of this application, after receiving the time-domain signal sent by the sending device, the receiving device replicates the received time-domain signal into the N time-domain signals, and respectively shapes the N time-domain signals with the N windows whose window lengths are different. According to a principle of the window length and interference suppression caused by spectrum leakage, a longer window length indicates a better interference suppression effect. Based on this, after the N windowed time-domain signals are respectively converted into the N frequency-domain signals, the receiving device selects, from a frequency-domain signal with a relatively long window length, RBs with relatively high interference, namely, RBs that have a relatively short distance from the RB corresponding to the interference frequency, selects, from a frequency-domain signal with a relatively short window length, RBs with relatively low interference, namely, RBs that have a relatively long distance from the RB corresponding to the interference frequency, and then combines the selected RBs to obtain the target frequency-domain signal. It can be learned that in this solution, one time-domain signal is shaped with the N windows with different window lengths, and then the RBs are selected from the frequency-domain signals with different window lengths based on the relationship between the interference strength and the window length, so that it can be ensured that in the finally obtained frequency-domain signal, each RB receives minimum interference due to spectrum leakage. Therefore, in a scenario in which signals of a plurality of standards share a spectrum and a signal of at least one standard uses an OFDM transmission technology, interference caused by the spectrum leakage can be effectively suppressed, thereby optimizing signal receiving performance.

DESCRIPTION OF EMBODIMENTS

Figure 1:
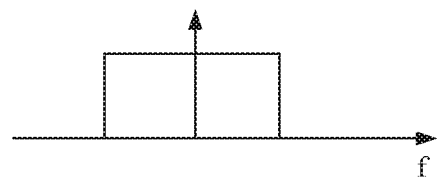
FIG. 1 is a schematic diagram of a frequency-domain signal according to an embodiment of this application.
Figure 2:
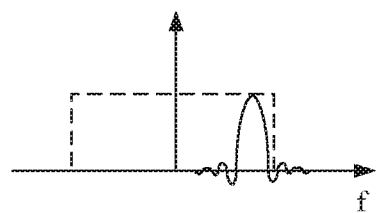
FIG. 2 is a schematic diagram of a frequency-domain signal in a second implementation according to an embodiment of this application.

In view of a property of an FFT operation, to suppress interference caused by spectrum leakage, a common method is as follows: After receiving a time-domain signal and before performing an FFT operation on the time-domain signal, a receiving device shapes the time-domain signal with a window.

The received time-domain signal being $y(x1)$ is used as an example, where $x1=0, \ldots,$ and $X+P-1$, X is a quantity of FFT sampling points, and P is a length of a preset cyclic prefix (CP). A window function is set. A quantity of sampling points (namely, window lengths) corresponding to the window function is W. and each sampling point corresponds to a window coefficient w. A point multiplication operation, and the like are performed by using the window function and the time-domain signal $y(x1)$. The operation is to shape the time-domain signal $y(x1)$ with a window, and obtain a signal $z(x2)$ after the time-domain signal $y(x1)$ is shaped with the window, where $x2=0, \ldots,$ and $X-1$. Specifically, when $x2=0, \ldots,$ and $X-W-1$, $z(x2)$ meets $z(x2)=y(x2+P)$. When $x2=X-W, \ldots,$ and $X-1$, $z(x2)$ meets $z(x2)=w(x2+W-X)*y(x2+P-X)+(1-w(x2+W-X))*y(x2+P)$.

The interference is suppressed by shaping the time-domain signal with the window. A longer window length corresponding to a corresponding window function indicates a better interference suppression effect, and a shorter window length corresponding to a corresponding window function indicates a poorer interference suppression effect.

Based on this, it needs to be noted that, in a concept of time domain, an OFDM symbol is usually defined as a time-domain unit. During time-domain signal transmission, a sending device usually transmits a same time-domain signal along a plurality of transmission paths. Because transmission delays of the plurality of transmission paths are different, OFDM symbols transmitted to the receiving device along different transmission paths at a same time are different, resulting in mutual interference between symbols. This phenomenon is referred to as intersymbol interference (ISI). To eliminate the ISI, a common practice is as follows: Before sending the time-domain signal, the sending device adds the CP between OFDM symbols of the time-domain signal. The CP may form a guard interval between symbols, so that when two OFDM symbols that pass through different transmission paths arrive at the receiving device, one OFDM symbol falls within a guard interval of the other OFDM symbol, to eliminate impact between the two OFDM symbols. Based on this, the length P of the CP is usually greater than a maximum multipath delay.

To avoid causing the ISI, when the window function is set, the window length W corresponding to the window function usually refers to the length P of the preset CP and a length of a preset multipath delay spread. Generally, the window length W does not exceed the length of the CP minus a value of the multipath delay spread. The value of the multipath delay spread is a difference between a maximum transmission delay and a minimum transmission delay.

Based on the foregoing descriptions about windowing, although a relatively long window length W has a relatively good interference suppression effect, the relatively long window length W causes the ISI. Therefore, interference is caused to a signal on the other hand. However, if the window length W is relatively short, an interference suppression effect is relatively poor. It can be learned that a common signal receiving method cannot achieve a relatively ideal effect of suppressing interference. Therefore, to resolve the problem, a person skilled in the art obtains this application through research.

The following describes the embodiments of this application with reference to accompanying drawings.

Figure 3:
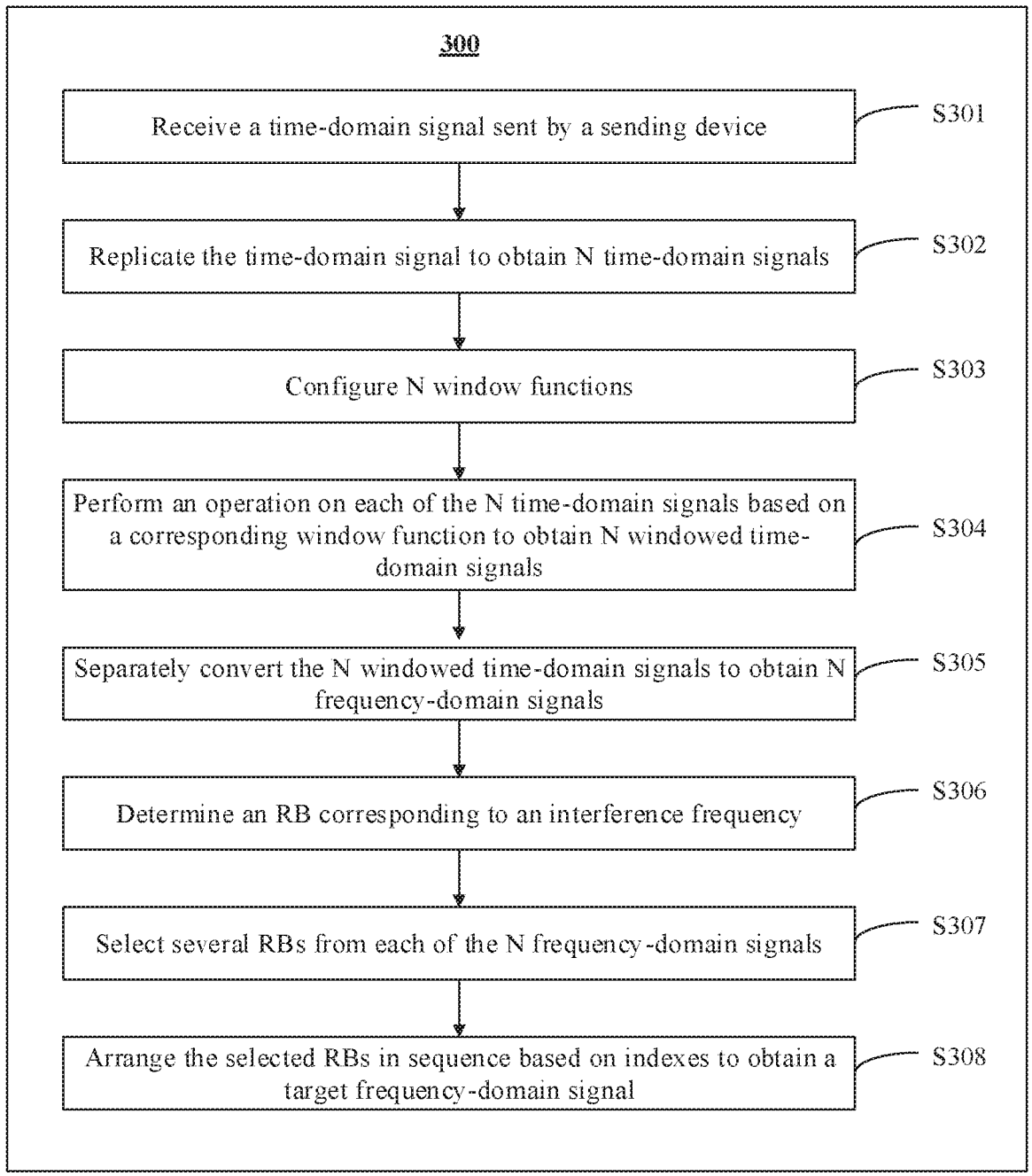
FIG. 3 is a method flowchart of a signal receiving method according to an embodiment of this application.

FIG. 3 is a method flowchart of a signal receiving method according to an embodiment of this application. The method 300 shown in FIG. 3 can effectively suppress interference caused by spectrum leakage, to optimize signal receiving performance. Specifically, the method 300 includes the following steps.

Step S301: Receive a time-domain signal sent by a sending device.

It can be learned from an implementation scenario of this solution that this embodiment of this application is implemented based on an OFDM technology. Based on this, in this embodiment of this application, both the sending device and a receiving device are devices that can support the OFDM technology.

Further, this solution is applicable to a scenario in which a base station sends a time-domain signal to a terminal, and is also applicable to a scenario in which the terminal sends a time-domain signal to the base station. Therefore, in this embodiment of this application, the sending device may be the base station or the terminal. When the sending device is the terminal, the receiving device is the base station. When the sending device is the base station, the receiving device is the terminal. This is not limited in this embodiment of this application.

It needs to be noted that, it can be learned from the descriptions of the prior art that, in this embodiment of this application, the time-domain signal is an OFDM signal and an inter-RAT signal that are carried on a same spectrum, and the OFDM signal is a network signal that is based on the OFDM technology. The inter-standard signal is a signal whose numerology is different from that of the OFDM signal and a signal that is based on another transmission technology, for example, a GSM signal and a universal mobile telecommunications system (UMTS) signal that is based on a code division multiple access (CDMA) technology. The numerology is a parameter used in a communications system. The communications system (for example, 5G) may support a plurality of types of numerologies. The numerology may be defined by using one or more of the following parameter information: a subcarrier spacing, a CP, a time unit, a bandwidth, and the like. For example, the numerology may be defined by using the subcarrier spacing and the CP. Specifically, the time-domain signal may include at least one inter-RAT signal.

Step S302: Replicate the time-domain signal to obtain N time-domain signals.

When the sending device sends one time-domain signal to the receiving device, the time-domain signal is usually sent through only one signal. Because only one window function can be correspondingly set for one time-domain signal, and an operation is performed based on the window function (that is, shaping with only one window can be performed). However, in a manner of shaping with one window, not only the interference suppression effect cannot reach an ideal state, but also further optimization of signal performance is greatly limited. Based on this, in this embodiment of this application, after receiving the time-domain signal, the receiving device shapes a same time-domain signal with a plurality of windows, so that signal performance can be further optimized. To shape the same time-domain signal with the plurality of windows, in this embodiment of this application, after receiving one time-domain signal, the receiving device replicates the time-domain signal from one time-domain signal into N time-domain signals, and then may shape each of the N time-domain signals with a window. In this way, an effect of shaping the same time-domain signal with the plurality of windows is implemented.

It needs to be noted that, on one hand, compared with the prior art in which one time-domain signal is shaped with one window, in this embodiment of this application, one time-domain signal needs to be shaped with at least two windows. Therefore, in this embodiment of this application, N may be at least 2. On the other hand, in this field, a resource block (RB) is usually used as a composition unit of a frequency-domain signal. One frequency-domain signal may be considered as one resource block group (RBG). The RBG includes a plurality of RBs, and each RB carries some information. Based on this, when the interference to the signal is determined, the interference to an RB may be specifically determined. Similarly, when the interference suppression effect is determined, the interference suppression effect on an RB may also be specifically determined. In view of this, with reference to a relationship between windowing and interference suppression, in this embodiment of this application, N may be at most a total quantity of RBs included in the time-domain signal.

The time-domain signal and the frequency-domain signal are expressions of two dimensions of a same signal. In time domain, one RB is one slot, and in frequency domain, one RB is 12 subcarriers. Based on this, after receiving the time-domain signal, the receiving device may determine, based on a total bandwidth of the time-domain signal, the total quantity of RBs in the RBG corresponding to the time-domain signal. Specifically, representation parameters, of the RB, in time domain and frequency domain are technologies well known by a person skilled in the art. Details are not described in this embodiment of this application.

Step S303: Configure N window functions.

Following step S302, after replicating the same time-domain signal into the N time-domain signals, the receiving device may configure window functions for the N time-domain signals one by one, to obtain the N window functions. In this embodiment of this application, shaping one time-domain signal with a plurality of windows is to further optimize signal performance. Therefore, window lengths corresponding to the N window functions are different, that is, quantities of sampling points corresponding to the N window functions are different.

Further, it needs to be noted that when a same RB corresponds to different window lengths, performance is exactly different. For example, when an RB corresponds to the shortest window length, interference caused by spectrum leakage is relatively strong; when an RB corresponds to the longest window length, although interference caused by spectrum leakage is relatively weak, there is relatively strong ISI. In view of this, in this embodiment of this application, a limitation condition for setting a window length may be relaxed, so that window lengths corresponding to different RBs when performance is optional are included, thereby optimizing overall performance of a signal. Specifically, in this embodiment of this application, a minimum window length corresponding to the N window functions may be 0, and a maximum window length corresponding to the N window functions may be a length of a preset CP. The CP is preset by the sending device, and the length of the CP meets a stipulation in a sending protocol. Details are not described in this embodiment of this application.

It needs to be noted that, it can be learned from the descriptions of the prior art that, to avoid causing the ISI, the window length does not exceed the length of the CP minus a value of a multipath delay spread. However, in this embodiment of this application, although a signal with a relatively long window length causes the ISI, in a signal with a relatively short window length, interference suppression and caused ISI can be well balanced. Therefore, in this embodiment of this application, the window length may exceed the length of the CP minus the value of the multipath delay spread.

Further, it can be learned from the descriptions in step S302 that N is greater than or equal to 2 and less than or equal to the length of the preset CP. Based on this, when N is a different quantity, a window length of each of the N time-domain signals may be flexibly set. For example, when N is 2, the relatively long window length may be ⅔ of the preset CP length, and the relatively short window length may be ¼ of the preset CP length. When N is the total quantity of RBs, the shortest window length may be set to 0, and another window length may be set by using the preset CP length/N as a length unit, and is set in an equal difference manner. When N is greater than 2 and less than the total quantity of RBs, the receiving device may flexibly configure each window length. Specifically, this is not limited in this embodiment of this application.

In addition, the window function includes a plurality of types: a rectangular window function, a Hanning window function, a Hamming window function, and a Gaussian window function. In this embodiment of this application, the N window functions may be a same window function, for example, a Hamming window function, or may be a plurality of different window functions. In an optional embodiment, to clearly distinguish between interference suppression effects of different window lengths on RBs, the N window functions are usually a same window function. Specifically, details are not described in this embodiment of this application.

Step S304: Perform an operation on each of the N time-domain signals based on a corresponding window function to obtain N windowed time-domain signals.

According to the descriptions in the foregoing steps, after the window functions are set for the N time-domain signals one by one, the operation is separately performed on each of the N time-domain signals based on the corresponding window functions to obtain the N windowed time-domain signals. Specifically, for a process of performing the operation based on the window function, refer to related descriptions in the prior art. Details are not described herein in this embodiment of this application.

It can be learned that in this embodiment of this application, one time-domain signal is shaped with the plurality of windows. This not only breaks a limitation that shaping with one window imposes on signal performance improvement, but also can more accurately balance performance of each RB, thereby improving overall performance of the signal.

Step S305: Separately convert the N windowed time-domain signals to obtain N frequency-domain signals.

The time-domain signal is converted into the frequency-domain signal by using the OFDM technology, and an FFT operation is usually used. Based on this, in this embodiment of this application, the FFT operation is separately performed on the N windowed time-domain signals to obtain the N frequency-domain signals. Specifically, the FFT operation is a technology that is relatively familiar to the person skilled in the art. Details are not described in this embodiment of this application.

A representation form of the frequency-domain signal is an RBG including RBs that are arranged in sequence from a low frequency to a high frequency. When scheduling a resource, the base station sets, for each RB, an identifier index in a corresponding RBG. In addition, an identifier index of an RB in a low frequency band is usually smaller than an identifier index of an RB in a high frequency band. Therefore, the RBs are arranged in sequence from the low frequency to the high frequency, that is, the RBs are arranged in sequence based on indexes. Therefore, the RBs in the RBG are arranged in the frequency-domain signal in sequence based on the indexes.

It needs to be noted that because content of the N time-domain signals is exactly the same, content of the N frequency-domain signals obtained after the same operation is performed is also exactly the same. Specifically, in the N frequency-domain signals, a quantity of RBs, an index and arrangement of each RB, and information carried by each RB are the same. However, because the window lengths of the N windowed time-domain signals are different, interference, of a same RB, in different frequency-domain signals is different.

Step S306: Determine an RB corresponding to an interference frequency.

In this embodiment of this application, the interference frequency is a frequency that causes interference to a signal.

It can be learned from the descriptions in the foregoing steps that the content of the N frequency-domain signals is exactly the same, and interference, corresponding to each RB, in the N frequency-domain signals is different. Based on this, in this embodiment of this application, for each RB in the frequency-domain signal, the receiving device may select RBs with optimal performance from the N frequency-domain signals, and then combine the selected RBs in sequence in the RBG to obtain a final frequency-domain signal, namely, a target frequency-domain signal in this embodiment of this application.

Based on this, before selecting the RBs, the receiving device may first determine the RB corresponding to the interference frequency. The RB corresponding to the interference frequency is a location with the strongest interference. In addition, an RB closer to the RB corresponding to the interference frequency receive stronger interference, and an RB farther from the RB corresponding to the interference frequency receive weaker interference. It can be learned that determining the RB corresponding to the interference frequency is a key step to accurately select the RBs in this embodiment of this application.

Specifically, before the sending device sends the time-domain signal, the base station usually needs to schedule a spectrum resource carrying corresponding information and a transmitted signal. Therefore, a frequency on which interference is generated may be determined in advance, and then the RBs are configured with reference to the interference frequency. Therefore, in this embodiment of this application, the RB corresponding to the interference frequency may be determined in at least the following two manners.

Manner 1: Usually, after determining the interference frequency, the base station sets, when configuring RBs, the RB corresponding to the interference frequency to null, or does not use corresponding RB to send information, and the RBs are usually arranged in sequence based on the indexes. Therefore, if an RB in the RBG does not carry any information, or an RB is not configured in the RBG, indexes of RBs, carrying information, in the RBG are no longer consecutive.

Based on this, in this embodiment of this application, the receiving device may identify the indexes of the RBs in the RBG, determine, based on the indexes, RBs that are not configured in the RBG, and further determine the RBs that are not configured in the RBG, as RBs corresponding to the interference frequency. The RBs that are not configured in the RBG include an RB corresponding to a missing index between a minimum index and a maximum index in the indexes.

In addition, it needs to be noted that in this embodiment of this application, an RB corresponding to an adjacent index before the minimum index and an RB corresponding to an adjacent index after the maximum index in the indexes are usually determined as the interference frequency by default. Therefore, in this embodiment, the RBs that are not configured in the RBG further include an RB corresponding to an index being a minimum index minus 1 and an RB corresponding to an index being a maximum index plus 1.

The determining manner is applicable to the base station and the terminal.

Manner 2: Because the base station already predicts a to-be-transmitted signal and a used spectrum, when the receiving device is the base station, a frequency index corresponding to the interference frequency may be determined through calculation, and then an index of a corresponding RB may be determined based on the frequency index. The RB corresponding to the index is the RB corresponding to the interference frequency.

It needs to be noted that currently, the base station has a function of scheduling a spectrum resource. Therefore, the base station can learn of information about the interference frequency. However, the terminal does not have a function of scheduling a spectrum resource, and usually requests information about configured RBs from the base station. Therefore, the terminal cannot directly learn of the information about the interference frequency, so that Manner 2 is applicable only to a scenario in which the receiving device is the base station.

Step S307: Select several RBs from each of the N frequency-domain signals.

Based on the foregoing descriptions, for each RB in the frequency-domain signal, different window lengths have different balance effects on interference suppression effects and ISI of the RB. Based on this, corresponding to each RB, the receiving device may select, from the frequency-domain signals corresponding to the N window lengths, one frequency-domain signal with optimal performance, that is, select one RB with minimum ISI and a best interference suppression effect. Therefore, in this embodiment of this application, each RB may be from only one frequency-domain signal in the N frequency-domain signals, so that RBs selected from each frequency-domain signal are not repeated with RBs selected from another frequency-domain signal.

Specifically, it can be learned from the descriptions in step S306 that the RB corresponding to the interference frequency is the location with strongest interference, and the RB closer to the location with strongest interference receives stronger interference, the RB farther from the location with strongest interference receives weaker interference, and the longer the window is, the better the interference suppression effect is. Therefore, when selecting the RBs, the receiving device may select, from a frequency-domain signal with a relatively long window length, an RB with relatively strong interference, that is, select, from the frequency-domain signal with a relatively long window length, an RB that is relatively close to the RB corresponding to the interference frequency; and select, from a frequency-domain signal with a relatively short window length, an RB with relatively weak interference, that is, select, from the frequency-domain signal with a relatively short window length, an RB that is relatively far away from the RB corresponding to the interference frequency.

For example, after the RBs that correspond to the indexes and that are not configured in the RBG are determined, consecutive indexes that are formed due to cutting off by indexes of the RBs not configured in the RBG are identified, several RBs located at two ends of the consecutive indexes are selected from the frequency-domain signal with a relatively long window length, and several RBs located at a center of the consecutive indexes are selected from the frequency-domain signal with a relatively short window length. For another example, when the RB corresponding to the interference frequency is determined based on the frequency index, several adjacent RBs on two sides of the RB corresponding to the interference frequency are selected from the frequency-domain signal with a relatively long window length, and several RBs on two sides that are relatively far away from the RB corresponding to the interference frequency are selected from the frequency-domain signal with a relatively short window length.

It needs to be noted that a quantity of RBs selected from the frequency-domain signal corresponding to each window length depends on a total quantity of RBs and a specific value of N. When the value of N is less than the total quantity of RBs, a quantity of RBs selected from the frequency-domain signal corresponding to at least one window length is greater than 1. When the value of N is equal to the total quantity of RBs, one RB may be selected from the frequency-domain signal corresponding to each window length. Specifically, the receiving device may perform an operation flexibly. This is not limited in this embodiment of this application.

For example, when N is 2, and the RBG includes 30 RBs in total, 18 RBs may be selected from the frequency-domain signal with a relatively long window length, and 12 RBs may be selected from the frequency-domain signal with a relatively short window length. For another example, when N is 5, and the RBG includes 30 RBs in total, six RBs may be selected from the frequency-domain signal with each window length. For another example, when N is 30, and the RBG includes 30 RBs in total, one RB may be selected from the frequency-domain signal with each window length.

Step S308: Arrange the selected RBs in sequence based on indexes to obtain the target frequency-domain signal.

After obtaining the frequency-domain signal, the receiving device needs to perform a demodulation operation on the frequency-domain signal, for example, perform operations such as channel equalization, channel demapping, and channel decoding on the frequency-domain signal, to finally obtain signal content. The demodulation operation is usually an inverse operation of a modulation operation. Therefore, integrity of the frequency-domain signal needs to be ensured. Based on this, after selecting the RBs, the receiving device may arrange the selected RBs in sequence based on indexes to obtain the target frequency-domain signal.

It needs to be noted that, to set a guard interval and reduce interference caused by interference to useful information, during RB configuration, the RB corresponding to the interference frequency is usually configured not to carry any information. Based on this, when combining the selected RBs, the receiving device may directly delete the RB corresponding to the interference frequency, and arrange only the RBs other than the RB corresponding to the interference frequency in sequence based on indexes.

Further, if the interference is relatively strong, and only the RB corresponding to the interference frequency does not carry any information, the base station may still cause relatively strong interference to another RB. In view of this, when an interference strength corresponding to the interference frequency is greater than a preset threshold, the RB corresponding to the interference frequency and the RB other than the RB adjacent to the RB corresponding to the interference frequency may be arranged in sequence based on the indexes, to obtain the target frequency-domain signal. The preset threshold may be flexibly set by the base station as required. This is not limited in this embodiment of this application.

It can be learned that in this embodiment, a quantity of RBs in the target frequency-domain signal can be reduced, so that overheads occupied for parsing the target frequency-domain signal can be reduced.

Certainly, the foregoing is only an optional implementation in a scenario in which RBs with a relatively high interference strength do not carry any information. In another optional implementation, if the RBs with the relatively high interference strength carry information, the receiving device may first determine that the RB corresponding to the interference frequency carries information, then, select the RB that corresponds to the interference frequency and that is with best performance based on step S307, and perform a combination operation on the selected RB corresponding to the interference frequency based on step S308.

In conclusion, in this embodiment of this application, the receiving device can shape the time-domain signal with the N windows, and the window lengths of the N windows are different. Therefore, the RBs with best performance can be selected based on different window lengths, and the selected RBs with best performance can be combined to obtain the target frequency-domain signal. It can be learned that in the technical solution in this embodiment of this application, a limitation that only one window imposes on signal performance improvement is broken through shaping with a plurality of windows. In addition, an interference suppression effect and ISI of each RB can be better balanced, thereby improving overall signal performance.

To make a person skilled in the art more clearly and specifically understand the solution, the following describes the solution in a form of specific embodiments.

Figure 4:
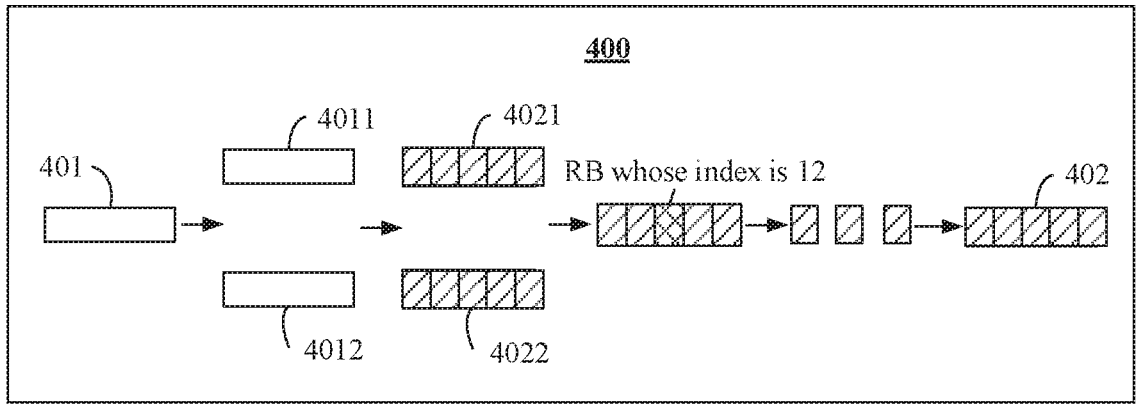
FIG. 4 is a diagram of an operation procedure of signal receiving according to an embodiment of this application.

FIG. 4 is a diagram of an operation procedure of signal receiving according to an embodiment of this application. In the operation procedure 400 in this embodiment, a base station is used as a receiving device, and it is assumed that a signal of a shared spectrum includes an LTE signal and a GSM signal. It is assumed that in this embodiment, a value of N is 2, an RBG corresponding to the signal includes 25 RBs in total, and indexes of the 25 RBs are 0 to 24 respectively.

After receiving a time-domain signal 401 sent by a terminal, the base station replicates the time-domain signal 401 to obtain a time-domain signal 4011 and a time-domain signal 4012. Content of the time-domain signal 4011, the time-domain signal 4012, and the time-domain signal 401 is exactly the same.

Then, the base station separately sets a window function for the time-domain signal 4011 and the time-domain signal 4012, and separately performs an operation on the time-domain signal 4011 and the time-domain signal 4012 based on the corresponding window function, to shape the time-domain signal 4011 with a window and shape the time-domain signal 4012 with a window, separately. Specifically, it is assumed that a length of a CP set by the terminal for the time-domain signal 401 is S. In this case, in this embodiment, a window length of the window with which the time-domain signal 4011 is shaped by the base station is 2S/3, and a window length of the window with which the time-domain signal 4012 is shaped by the base station is S/5.

Further, the base station performs an FFT operation on the windowed time-domain signal 4011, and converts the windowed time-domain signal 4011 into a frequency-domain signal 4021. In addition, the base station performs an FFT operation on the windowed time-domain signal 4012, and converts the windowed time domain signal 4012 into a frequency-domain signal 4022. Content of the frequency-domain signal 4021 is the same as that of the frequency-domain signal 4022, that is, both the frequency-domain signal 4021 and the frequency-domain signal 4022 include the RBs whose indexes are from 0 to 24. In addition, arrangement of the 25 RBs in the frequency-domain signal 4021 is the same as that of the 25 RBs in the frequency-domain signal 4022, and information carried in the frequency-domain signal 4021 and the frequency-domain signal 4022 by each RB is also the same.

Figure 5:
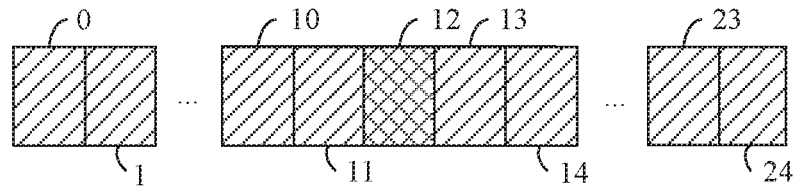
FIG. 5 is a schematic diagram of an RB arrangement structure according to the embodiment shown in FIG. 4.

In this embodiment, the base station may calculate, based on a spectrum for sending the time-domain signal 401, a frequency number of an interference frequency, and further obtain, based on the frequency number, an RB corresponding to the interference frequency. For example, with reference to a schematic diagram of an RB arrangement structure shown in FIG. 5, the RB corresponding to the interference frequency is an RB whose index is 12. Based on this, the base station may determine, based on two window lengths 2S/3 and S/5, interference to each RB and a size of ISI, and further select RBs from the frequency-domain signal 4021 or the frequency-domain signal 4022. Specifically, for example, calculation shows that, there are separately seven consecutive RBs to the left and right of a center that is the RB whose index is 12 shown in FIG. 5; when the window length is 2S/3, the interference and the ISI are minimum; and when the window length is S/5, the ISI is relatively weak or even 0, but the interference is relatively strong. Therefore, RBs whose indexes are 5 to 11 and RBs whose indexes are 13 to 19 are selected from the frequency-domain signal 4021. Based on the same principle, for RBs whose indexes are 0 to 4 and RBs whose indexes are 20 to 24, when the window length is 2S/3, the interference is weak or even 0, but the ISI is relatively strong. When the window length is S/5, both the interference and the ISI are minimum. Therefore, the RBs whose indexes are 0 to 4 and the RBs whose indexes are 20 to 24 are selected from the frequency-domain signal 4022.

Finally, RBs selected from the frequency-domain signal 4021 and the frequency-domain signal 4022 are arranged in sequence from an index 0 to an index 24 to obtain a target frequency-domain signal 402. Then, the base station may parse the target frequency-domain signal 402 to obtain content of the signal.

It needs to be noted that the foregoing descriptions are merely an optional embodiment of this application, and constitutes no limitation to this embodiment of this application. In the operation procedure 400, the RB corresponding to the interference frequency may be any RB. For example, the RB corresponding to the interference frequency is an RB whose index is 23. In addition, there may be more than one interference frequency. Correspondingly, there is more than one RB corresponding to the interference frequency. Further, when there is more than one RB corresponding to the interference frequency, an interference strength at each interference frequency may be different. However, regardless of a quantity of interference frequencies and strengths at the interference frequencies, the base station selects the RBs based on the interference strength and the ISI strength.

In addition, in this embodiment, because the base station already knows in advance that the RB whose index is 12 is the RB corresponding to the interference frequency, during scheduling, it may be set that an RB whose index is 11 to an RB whose index is 13 do not carry any information. Based on this, when selecting the RBs, the base station may arrange RBs other than the RB whose index is 11 to the RB whose index is 13 in sequence based on the indexes to obtain the target frequency-domain signal 402.

Certainly, if the RB whose index is 11 to the RB whose index is 13 carry a desired signal, the base station may select the RB whose index is 11 to the RB whose index is 13 from the frequency-domain signal 4021 based on the foregoing selection process, and then arrange all the selected RBs in sequence based on indexes. Specifically, details are not described in this embodiment of this application.

Figure 6:
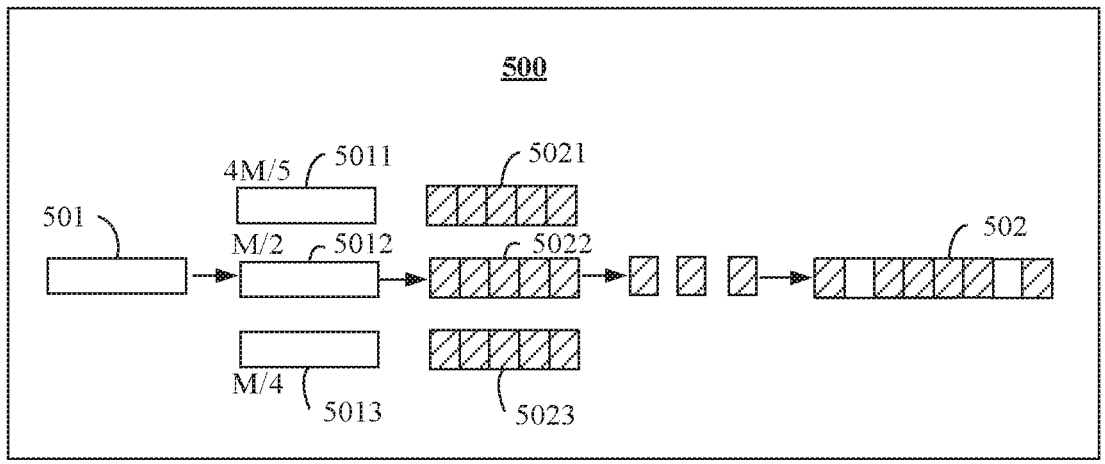
FIG. 6 is a diagram of an operation procedure of a second implementation of signal receiving according to an embodiment of this application.

FIG. 6 is a diagram of an operation procedure of a second implementation of signal receiving according to an embodiment of this application. In the operation procedure 500 in this embodiment, a terminal is used as a receiving device, and it is assumed that a signal of a shared spectrum includes an LTE signal and a GSM signal. Specifically, it is assumed that in this embodiment, a value of N is 3, an RBG corresponding to the signal includes 30 RBs in total, and indexes of the 30 RBs are an index 0, an index 2 to an index 14, an index 17, an index 20, and an index 21 to an index 34.

It is similar to the operation procedure 400 that, in this embodiment, after receiving a time-domain signal 501 sent by a base station, the terminal replicates the time-domain signal 501 to obtain a time-domain signal 5011, a time-domain signal 5012, and a time-domain signal 5013, separately sets a window function for the time-domain signal 5011, the time-domain signal 5012, and the time-domain signal 5013, and then separately performs an operation on the time-domain signal 5011, the time-domain signal 5012, and the time-domain signal 5013 based on the corresponding window function, to shape the time-domain signal 5011 with a window, shape the time-domain signal 5012 with a window, and shape the time-domain signal 5013 with a window. It is assumed that a length of a CP of the time-domain signal 501 is M, a window length of the time-domain signal 5011 that is shaped with the window by the terminal is 4M/5, a window length of the time-domain signal 5012 that is windowed is M/2, and a window length of the time-domain signal 5013 that is shaped with the window is M/4. Then, an FFT operation is separately performed on the windowed time-domain signal 5011, the windowed time-domain signal 5012, and the windowed time-domain signal 5013, to convert the time-domain signal 5011 into a frequency-domain signal 5021, convert the time-domain signal 5012 into a frequency-domain signal 5022, and convert the time-domain signal 5013 into a frequency-domain signal 5023.

It can be learned from the foregoing descriptions of determining the RB corresponding to the interference frequency that, because the terminal does not have a scheduling function, the terminal usually learns of configuration information of the RBs from the base station, and the configuration information of the RBs includes indexes of configured RBs and information carried by RBs with different indexes. Based on this, the terminal uses RBs that are not configured in the RBG, as RBs corresponding to the interference frequency, for example, RBs corresponding to an index −1, an index 1, an index 15, an index 16, an index 18, an index 19, and an index 35. With reference to this embodiment, consecutive indexes include the index 2 to the index 14, and the index 21 to the index 34. For the RBs corresponding to the index 2 to the index 14, an RB whose index is 1 and an RB whose index is 15 are RBs corresponding to the interference frequency. For the RBs corresponding to the index 21 to the index 34, an RB whose index is 20 and an RB whose index is 35 are RBs corresponding to the interference frequencies.

Figure 7:
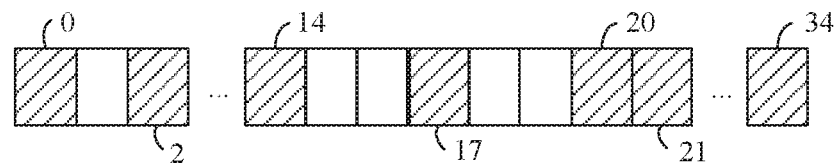
FIG. 7 is a schematic diagram of an RB arrangement structure according to the embodiment shown in FIG. 6.

In view of a rule for selecting an RB, with reference to a schematic diagram of RB arrangement shown in FIG. 7, in this embodiment, two consecutive RBs located at two ends of the RBs whose indexes are the index 2 to the index 14 and the index 21 to the index 34 may be selected from a frequency-domain signal whose window length is 4M/5. To be specific, as shown in FIG. 7, for the RBs whose indexes are 2 to 14, the RBs whose indexes are 2 and 3 and the RBs whose indexes are 13 and 14 are selected from the frequency-domain signal 5021. For the RBs whose indexes are 21 to 34, the RBs whose indexes are 21 and 22 and the RBs corresponding to the index 33 and the index 34 are selected from the frequency-domain signal 5021. The third RB, the fourth RB, and the fifth RB, located in each of directions towards a center from the two ends of the index 2 to the index 14 and directions towards a center from the two ends of the index 21 to the index 34, may be selected from a frequency-domain signal whose window length is M/2, where the centers are respectively a center of the index 2 to the index 14 and a center of the index 21 to the index 34. To be specific, as shown in FIG. 7, for the RBs whose indexes are 2 to 14, the RBs whose indexes are 4, 5, and 6 and the RBs whose indexes are 10, 11, and 12 are selected from the frequency-domain signal 5022. For the RBs whose indexes are 21 to 34, the RBs whose indexes are 23, 24, and 25 and the RBs corresponding to the index 30, the index 31, and the index 32 are selected from the frequency-domain signal 5022. Because an RB located at the center of the RBs whose indexes are 2 to 14 and an RB located at the center of the RBs whose indexes are 21 to 34 are farthest away from the RB corresponding to the interference frequency, the RBs may be selected from the frequency-domain signal whose window length is M/4. To be specific, as shown in FIG. 7, the RBs whose indexes are 2 to 14, the RBs whose indexes are 7, 8, and 9, the RBs whose indexes are 21 to 34, and the RBs corresponding to the index 26 to the index 29 are selected from the frequency-domain signal 5023.

Certainly, the foregoing is merely an optional implementation of this application. In another implementation, quantities of RBs selected from a same frequency-domain signal may be different in the RBs whose indexes are the index 3 to the index 14, and the index 21 to the index 34. For example, when the RBs are selected from the frequency-domain signal 5021, two consecutive RBs may be selected for the index 3 to the index 14 from two ends, and three consecutive RBs may be selected for the index 21 to the index 34 from two ends. Specifically, an RB is selected based on performance of the RB. This is not limited in this embodiment of this application.

Further, because the RBs with non-consecutive indexes are also relatively close to the RB corresponding to the interference frequency, the RBs with non-consecutive indexes may be selected from a frequency-domain signal with a longest window length, that is, the RBs corresponding to the index 0, the index 17, and the index 20 may be selected from the frequency-domain signal 5021.

It is similar to the operation procedure 400 that, in this embodiment, after the RBs are selected, the terminal may arrange the selected RBs in sequence based on indexes to finally obtain a target frequency-domain signal 502.

Certainly, the operation procedure 500 is not limited to use by the terminal, and is also applicable when the receiving device is the base station.

It needs to be noted that the operation procedure 400 and the operation procedure 500 are merely two examples listed in this embodiments of this application for ease of understanding by a person skilled in the art. This does not constitute a limitation to the embodiments of this application. In the foregoing operation process, any implementation formed by changing a value falls within the protection scope of this application.

In addition, the operation procedure 400 and the operation procedure 500 are merely optional examples of this application. In the method 300, the operation procedure 400, and the operation procedure 500, the OFDM signal not only includes the signal supporting the OFDM technology, for example, the LTE signal, but also includes a signal that supports another technology whose principle is the same as or similar to that of the OFDM technology, such as a 5G signal and a wireless fidelity (WiFi) signal. An inter-RAT signal may be, but is not limited to, a GSM signal, a CDMA signal, and a signal whose numerology is different from that of the OFDM signal.

It can be learned from the foregoing descriptions that in this embodiment of this application, N time-domain signals are shaped with windows with different window lengths, so that one time-domain signal can be shaped with a plurality of windows, thereby breaking a limitation that only one window imposes on signal performance improvement. In addition, in this embodiment of this application, window lengths of the N windows are different. The receiving device selects, based on a relationship between an interference strength and a window length. RBs from frequency-domain signals with different window lengths, and combines the selected RBs to obtain a final frequency-domain signal. In this way, it can be ensured that performance of each RB is the best, so that not only interference caused by spectrum leakage can be effectively suppressed, but also overall signal performance can be improved.

Figure 8:
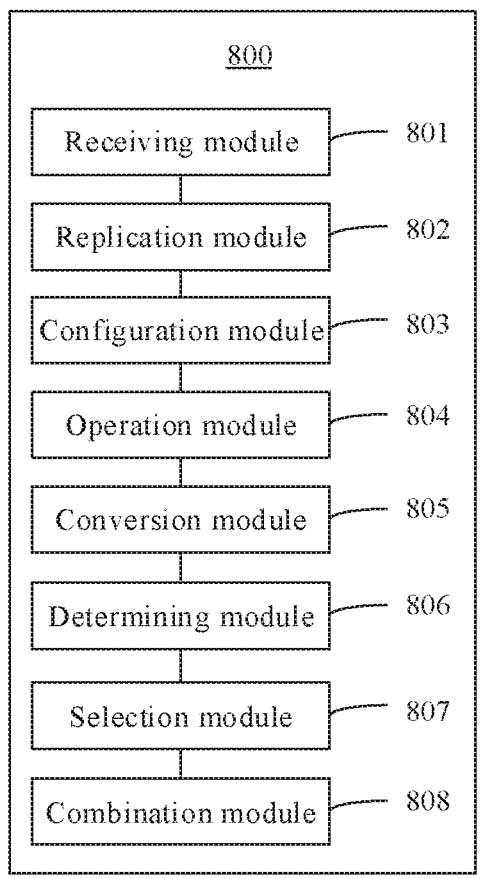
FIG. 8 is a schematic structural diagram of a signal receiving apparatus according to an embodiment of this application.

In correspondence to the method 300, FIG. 8 is a schematic diagram of a signal receiving apparatus 800 according to an embodiment of this application. The signal receiving apparatus 800 may be configured to perform the methods corresponding to FIG. 3, FIG. 4, and FIG. 6. As shown in FIG. 8, the signal receiving apparatus 800 includes a receiving module 801, a replication module 802, a configuration module 803, an operation module 804, a conversion module 805, a determining module 806, a selection module 807, and a combination module 808.

The receiving module 801 may be configured to receive a time-domain signal sent by a sending device. The replication module 802 may be configured to replicate the time-domain signal to obtain N time-domain signals, where N is greater than or equal to 2 and is less than or equal to a total quantity of RBs that are in an RBG and that correspond to the time-domain signal. The configuring module 803 is configured to configure N window functions, where the N window functions are in a one-to-one correspondence with the N time-domain signals, window lengths corresponding to the N window functions are all greater than or equal to 0 and are less than or equal to a length of a preset CP of the time-domain signal, and the window lengths corresponding to the N window functions are different; The operation module 804 may be configured to perform an operation on each of the N time-domain signals based on a corresponding window function to obtain N windowed time-domain signals. The conversion module 805 may be configured to separately convert the N windowed time-domain signals to obtain N frequency-domain signals, where the RBs in the RBG all meet the following condition in the N frequency-domain signals: being arranged in sequence based on indexes, where the indexes refer to identifier indexes, of the RBs, in the RBG. The determining module 806 may be configured to determine an RB corresponding to an interference frequency, where the interference frequency refers to a frequency on which interference is generated. The selection module 807 is configured to select several RBs from each of the N frequency-domain signals, where the RBs selected from each of the N frequency-domain signals are different from those selected from another frequency-domain signal, and a distance between RBs selected from a frequency-domain signal with a relatively long window length and the RB corresponding to the interference frequency is less than that between RBs selected from a frequency-domain signal with a relatively short window length and the RB corresponding to the interference frequency. The combination module 808 is configured to arrange the selected RBs in sequence based on indexes to obtain a target frequency-domain signal.

For specific content, refer to descriptions of related parts in the embodiment of the method 300. Details are not described herein again.

Figure 9:
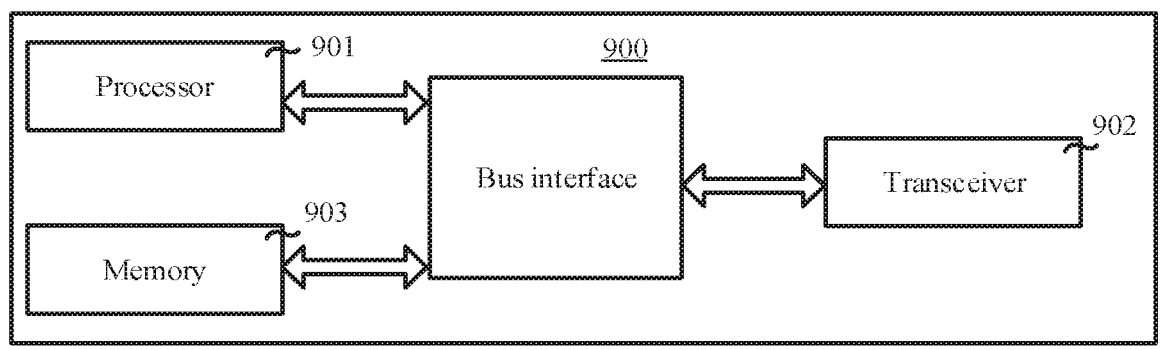
FIG. 9 is a schematic structural diagram of a signal receiving device according to an embodiment of this application.

It needs to be understood that division into the foregoing modules is merely logical function division. During actual implementation, all or some of the modules may be integrated into one physical entity, or may be physically separated. In this embodiment of this application, the receiving module 801 may be implemented by a transceiver, and the replication module 802, the configuration module 803, the operation module 804, the conversion module 805, the determining module 806, the selection module 807, and the combination module 808 may be implemented by a processor. As shown in FIG. 9, a signal receiving device 900 may include a processor 901, a transceiver 902, and a memory 903. The memory 903 may be configured to store a program/code pre-installed when the signal receiving device 900 is delivered from a factory, or may store code or the like executed by the processor 901.

It needs to be understood that the signal receiving device 900 in this embodiment of this application may correspond to the base station or the terminal in the method 300. The transceiver 902 is configured to receive the time-domain signal in the method 300, and the processor 901 is configured to perform other processing in the method 300 than time-domain signal receiving. Details are not described herein again.

During specific implementation, corresponding to the signal receiving device, an embodiment of this application further provides a computer storage medium. The computer storage medium disposed in any device may store a program. When the program is executed, a part of or all steps of the signal receiving methods provided in FIG. 3, FIG. 4, and FIG. 6 may be implemented. A storage medium in any device may be a magnetic disk, an optical disc, a read-only memory (read-only memory, ROM for short), a random access memory (random access memory, RAM for short), or the like.

In this embodiment of this application, the transceiver may be a wired transceiver, a wireless transceiver, or a combination thereof. The wired transceiver may be, for example, an ethernet interface. The ethernet interface may be an optical interface, an electrical interface, or a combination thereof. The wireless transceiver may be, for example, a wireless local area network transceiver, a cellular network transceiver, or a combination thereof. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof. The memory may include a volatile memory such as a random access memory (RAM), or the memory may include a non-volatile memory such as a read-only memory (ROM), a flash memory, a hard disk drive (HDD), or a solid-state drive (SSD), or the memory may include a combination of the foregoing types of memories.

A bus interface may further be included in FIG. 9, and the bus interface may include any quantity of interconnecting buses and bridges, and specifically connect together various circuits of one or more processors represented by the processor and a memory represented by the memory. The bus interface may further link together various other circuits, such as a peripheral device, a voltage regulator, and a power management circuit. This is well known in the art, and therefore is not further described in this specification. The bus interface provides an interface. The transceiver provides a unit configured to communicate with various other devices on a transmission medium. The processor is responsible for managing a bus architecture and normal processing. The memory may store data used when the processor is performing an operation.

A person skilled in the art may further understand that various illustrative logical blocks and steps that are listed in the embodiments of this application may be implemented by using electronic hardware, computer software, or a combination thereof. Whether the functions are implemented by using hardware or software depends on a particular application and a design requirement of an entire system. A person skilled in the art may use various methods to implement the described functions for each particular application, but it does not need to be considered that the implementation goes beyond the scope of the embodiments of this application.

The various illustrative logical units and circuits described in the embodiments of this application may implement or operate the described functions via a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any traditional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor so that the processor may read information from the storage medium and write information to the storage medium. Optionally, the storage medium may further be integrated into a processor. The processor and the storage medium may be arranged in an ASIC, and the ASIC may be arranged in UE. Optionally, the processor and the storage medium may be arranged in different components of the UE.

It needs to be understood that sequence indexes of the foregoing processes do not mean execution sequences in various embodiments of this application. The execution sequences of the processes need to be determined based on functions and internal logic of the processes, and do not need to be construed as any limitation on the implementation processes of the embodiments of this application.

All or a part of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Disk (SSD)), or the like.

The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly. For related parts, refer to partial descriptions in the method embodiment. According to the foregoing descriptions of this specification in this application, technologies in the art may use or implement the content of this application.

Although embodiments of this application have been described, once learning of the basic inventive concept, a person skilled in the art can make additional changes and modifications to these embodiments once. Therefore, the following claims are intended to be construed as to cover the embodiments and all changes and modifications falling within the scope of this application.

Definitely, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A signal receiving method, wherein the method comprises:
   receiving a time-domain signal sent by a sending device;
   replicating the time-domain signal to obtain N time-domain signals, wherein N is greater than or equal to 2 and is less than or equal to a total quantity of resource blocks (RB)s that are in a resource block group (RBG) and that correspond to the time-domain signal;
   configuring N window functions, wherein the N window functions are in a one-to-one correspondence with the N time-domain signals, wherein respective window lengths corresponding to the N window functions are all greater than or equal to 0 and are less than or equal to a length of a preset cyclic prefix (CP) of the time-domain signal, and wherein the respective window lengths corresponding to the N window functions are different;
   performing an operation on each of the N time-domain signals based on a corresponding window function to obtain N windowed time-domain signals;
   separately converting the N windowed time-domain signals to obtain N frequency-domain signals, wherein the RBs in the RBG all meet the following condition in the N frequency-domain signals: being arranged in sequence based on respective indexes, wherein the respective indexes refer to identifier indexes of the RBs in the RBG;
   determining an RB corresponding to an interference frequency, wherein the interference frequency refers to a frequency on which interference is generated;
   selecting one or more RBs from each of the N frequency-domain signals, wherein the one or more RBs selected from each of the N frequency-domain signals are different from RBs selected from another frequency-domain signal, and wherein a distance between RBs selected from a frequency-domain signal with a first window length and the RB corresponding to the interference frequency is less than a distance between RBs selected from a frequency-domain signal with a second window length and the RB corresponding to the interference frequency, wherein the first window length is longer than the second window length; and
   arranging the selected one or more RBs in sequence based on the respective indexes to obtain a target frequency-domain signal.

2. The method according to claim 1, wherein the determining an RB corresponding to an interference frequency comprises:
   identifying the respective indexes of the RBs in the RBG;
   determining, based on the respective indexes, RBs not configured in the RBG, wherein the RBs not configured in the RBG comprise an RB corresponding to a missing index between a minimum index and a maximum index in the indexes, an RB corresponding to an index being a minimum index minus 1, and an RB corresponding to an index being a maximum index plus 1; and
   determining the RBs not configured in the RBG as RBs corresponding to the interference frequency.

3. The method according to claim 1, wherein the determining an RB corresponding to an interference frequency comprises:
   determining a frequency number of the interference frequency;
   determining an index of a corresponding RB based on the frequency number; and
   determining the RB corresponding to the index as the RB corresponding to the interference frequency.

4. The method according to claim 1, wherein the arranging the selected one or more RBs in sequence based on the respective indexes to obtain a target frequency-domain signal comprises:
   arranging RBs other than the RB corresponding to the interference frequency in sequence based on the respective indexes to obtain the target frequency-domain signal.

5. The method according to claim 1, wherein the arranging the selected one or more RBs in sequence based on the respective indexes comprises:
   when an interference strength corresponding to the interference frequency is greater than a preset threshold, arranging, in sequence based on the respective indexes, the RB corresponding to the interference frequency and an RB other than an RB adjacent to the RB corresponding to the interference frequency to obtain the target frequency-domain signal.

6. The method according to claim 1, wherein after the receiving a time-domain signal sent by a sending device and before the replicating the time-domain signal to obtain N time-domain signals, the method further comprises:
   determining a total bandwidth of the time-domain signal; and
   calculating the total quantity of the RBs in the RBG based on the total bandwidth of the time-domain signal.

7. A signal receiving apparatus, wherein the apparatus comprises:
   at least one processor; and
   a non-transitory computer-readable storage medium coupled to the at least one processor and storing programming instructions for execution by the at least one processor, wherein the programming instructions instruct the at least one processor to:
   receive a time-domain signal sent by a sending device;
   replicate the time-domain signal to obtain N time-domain signals, wherein N is greater than or equal to 2 and is less than or equal to a total quantity of resource blocks (RB)s that are in a resource block group (RBG) and that correspond to the time-domain signal;
   configure N window functions, wherein the N window functions are in a one-to-one correspondence with the N time-domain signals, wherein respective window lengths corresponding to the N window functions are all greater than or equal to 0 and are less than or equal to a length of a preset cyclic prefix (CP) of the time-domain signal, and wherein the respective window lengths corresponding to the N window functions are different;
   perform an operation on each of the N time-domain signals based on a corresponding window function to obtain N windowed time-domain signals;
   separately convert the N windowed time-domain signals to obtain N frequency-domain signals, wherein the RBs in the RBG all meet the following condition in the N frequency-domain signals: being arranged in sequence based on respective indexes, wherein the respective indexes refer to identifier indexes of the RBs in the RBG;
   determine an RB corresponding to an interference frequency, wherein the interference frequency refers to a frequency on which interference is generated;

select one or more RBs from each of the N frequency-domain signals, wherein the one or more RBs selected from each of the N frequency-domain signals are different from RBs selected from another frequency-domain signal, and wherein a distance between RBs selected from a frequency-domain signal with a first window length and the RB corresponding to the interference frequency is less than a distance between RBs selected from a frequency-domain signal with a second window length and the RB corresponding to the interference frequency, wherein the first window length is longer than the second window length; and arrange the selected one or more RBs in sequence based on the respective indexes to obtain a target frequency-domain signal.

8. The apparatus according to claim 7, wherein the programming instructions instruct the at least one processor to:

identify the respective indexes of the RBs in the RBG;

determine, based on the respective indexes, RBs not configured in the RBG, wherein the RBs not configured in the RBG comprise an RB corresponding to a missing index between a minimum index and a maximum index in the indexes, an RB corresponding to an index being a minimum index minus 1, and an RB corresponding to an index being a maximum index plus 1; and determine the RBs not configured in the RBG as the RB corresponding to the interference frequency.

9. The apparatus according to claim 7, wherein the programming instructions instruct the at least one processor to:

determine a frequency number of the interference frequency;

determine an index of a corresponding RB based on the frequency number; and determine the RB corresponding to the index as the RB corresponding to the interference frequency.

10. The apparatus according to claim 7, wherein the programming instructions instruct the at least one processor to:

arrange RBs other than the RB corresponding to the interference frequency in sequence based on the respective indexes to obtain the target frequency-domain signal.

11. The apparatus according to claim 7, wherein the programming instructions instruct the at least one processor to:

when an interference strength corresponding to the interference frequency is greater than a preset threshold, arrange, in sequence based on the respective indexes, the RB corresponding to the interference frequency and an RB other than an RB adjacent to the RB corresponding to the interference frequency to obtain the target frequency-domain signal.

12. The apparatus according to claim 7, wherein the programming instructions instruct the at least one processor to:

determine a total bandwidth of the time-domain signal; and calculate the total quantity of the RBs in the RBG based on the total bandwidth of the time-domain signal.

13. A non-transitory computer-readable storage medium, comprising an instruction, wherein when the instruction is run on a computer, the computer is enabled to perform a method, wherein the method comprises:

receiving a time-domain signal sent by a sending device;

replicating the time-domain signal to obtain N time-domain signals, wherein N is greater than or equal to 2 and is less than or equal to a total quantity of resource blocks (RB)s that are in a resource block group (RBG) and that correspond to the time-domain signal;

configuring N window functions, wherein the N window functions are in a one-to-one correspondence with the N time-domain signals, wherein respective window lengths corresponding to the N window functions are all greater than or equal to 0 and are less than or equal to a length of a preset cyclic prefix (CP) of the time-domain signal, and wherein the respective window lengths corresponding to the N window functions are different;

performing an operation on each of the N time-domain signals based on a corresponding window function to obtain N windowed time-domain signals;

separately converting the N windowed time-domain signals to obtain N frequency-domain signals, wherein the RBs in the RBG all meet the following condition in the N frequency-domain signals: being arranged in sequence based on respective indexes, wherein the respective indexes refer to identifier indexes of the RBs in the RBG;

determining an RB corresponding to an interference frequency, wherein the interference frequency refers to a frequency on which interference is generated;

selecting one or more RBs from each of the N frequency-domain signals, wherein the one or more RBs selected from each of the N frequency-domain signals are different from RBs selected from another frequency-domain signal, and wherein a distance between RBs selected from a frequency-domain signal with a first window length and the RB corresponding to the interference frequency is less than a distance between RBs selected from a frequency-domain signal with a second window length and the RB corresponding to the interference frequency, wherein the first window length is longer than the second window length; and arranging the selected one or more RBs in sequence based on the respective indexes to obtain a target frequency-domain signal.

14. The non-transitory computer-readable storage medium according to claim 13, wherein the determining an RB corresponding to an interference frequency comprises:

identifying the respective indexes of the RBs in the RBG;

determining, based on the respective indexes, RBs not configured in the RBG, wherein the RBs not configured in the RBG comprise an RB corresponding to a missing index between a minimum index and a maximum index in the indexes, an RB corresponding to an index being a minimum index minus 1, and an RB corresponding to an index being a maximum index plus 1; and determining the RBs not configured in the RBG as RBs corresponding to the interference frequency.

15. The non-transitory computer-readable storage medium according to claim 13, wherein the determining an RB corresponding to an interference frequency comprises:

determining a frequency number of the interference frequency;

determining an index of a corresponding RB based on the frequency number; and determining the RB corresponding to the index as the RB corresponding to the interference frequency.

16. The non-transitory computer-readable storage medium according to claim 13, wherein the arranging the selected one or more RBs in sequence based on the respective indexes to obtain a target frequency-domain signal specifically comprises:
   arranging RBs other than the RB corresponding to the interference frequency in sequence based on the respective indexes to obtain the target frequency-domain signal.

17. The non-transitory computer-readable storage medium according to claim 13, wherein the arranging the selected one or more RBs in sequence based on the respective indexes specifically comprises:
   when an interference strength corresponding to the interference frequency is greater than a preset threshold, arranging, in sequence based on the respective indexes, the RB corresponding to the interference frequency and an RB other than an RB adjacent to the RB corresponding to the interference frequency to obtain the target frequency-domain signal.

18. The non-transitory computer-readable storage medium according to claim 13, wherein after the receiving a time-domain signal sent by a sending device and before the replicating the time-domain signal to obtain N time-domain signals, the method further comprises:
   determining a total bandwidth of the time-domain signal; and
   calculating the total quantity of the RBs in the RBG based on the total bandwidth of the time-domain signal.

* * * * *